United States Patent [19]
Itoi

[11] Patent Number: 5,005,190
[45] Date of Patent: Apr. 2, 1991

[54] WINDOW SYSTEM SYNCHRONIZING PROTECTIVE CIRCUIT

[75] Inventor: Satoshi Itoi, Osaka, Japan

[73] Assignee: NEC Home Electronics Ltd., Osaka, Japan

[21] Appl. No.: 278,029

[22] Filed: Nov. 30, 1988

[30] Foreign Application Priority Data

Nov. 30, 1987 [JP] Japan .............................. 62-302843

[51] Int. Cl.⁵ .............................................. H04L 7/08
[52] U.S. Cl. .................................... 375/108; 375/119
[58] Field of Search ................. 375/95, 106, 108, 111, 375/118, 119; 370/100.1, 105.3; 369/59; 360/41; 307/601, 603

[56] References Cited

U.S. PATENT DOCUMENTS

| | | | |
|---|---|---|---|
| 4,160,240 | 7/1979 | Partipilo | 371/70 |
| 4,453,260 | 6/1984 | Inagawa et al. | 375/119 |
| 4,620,300 | 10/1986 | Ogawa | 375/106 |
| 4,716,578 | 12/1987 | Wight | 375/106 |

Primary Examiner—Benedict V. Safourek
Attorney, Agent, or Firm—Cushman, Darby & Cushman

[57] ABSTRACT

A window system synchronizing protective circuit. A window forming circuit forming windows having a predetermined position which detect the forthcoming synchronizing signal in accordance with a counted value of bit clock pulses produced by a bit clock. The window forming circuit forms a corresponding number of windows to a predetermined number of bit clock pulses before and after detecting a synchronizing signal. The window forming circuit generates a window signal. A protective synchronizing circuit which has the detected synchronizing signal and the window signal generates a protective signal which has a phasic relation to the detected synchronizing signal. If no synchronizing signal has been detected in the windows the protective synchronizing signal is output. If the synchronizing signal has not been detected after a predetermined period a window reset circuit changes the position of the windows.

17 Claims, 3 Drawing Sheets

WINDOW SYSTEM SYNCHRONIZING PROTECTIVE CIRCUIT

BACKGROUND OF THE INVENTION

The present invention relates to a window system synchronizing protective circuit for protecting a synchronizing signal which is detected within detecting windows. More particularly, the present invention relates to a window system synchronizing protective circuit in which the detecting windows are positioned to adjust to the detection synchronizing signal when the detection synchronizing signal has not been detected in the detecting windows for a given period.

A conventional synchronizing protective circuit 1, which is depicted in FIG. 3, serves to monitor a synchronizing signal added to digital data. Circuit 1 also serves to generate a protective synchronizing signal to restrain a signal loss or a fluctuation in signal phase. The detected synchronizing signal triggers a counter 3 for counting bit clock pulses transmitted from a bit clock generating circuit 2. The detected synchronizing signal is also collated with the counting output of the counter 3 by means of a collating circuit 4. The counter 3 outputs a protective synchronizing signal when a numeric value corresponding to a synchronizing period is counted and is simultaneously reset. For this reason, if the phase of the protective synchronizing signal does not match the phase of the detection synchronizing signal, the collating circuit 4 supplies a discordance output to a discordance counter 5. When the number of discordances counted by the discordance counter 5 is in excess of a prescribed number, the detected synchronizing signal is outputted in place of the protective synchronizing signal which has been outputted from the collating circuit 4 up to that time.

The above-described conventional synchronizing protective circuit 1 adopts a so-called resetting method in which the detected synchronizing signal is outputted when there are continuous phasic discordances in excess of a prescribed number between the protective synchronizing signal and the detected synchronizing signal. As illustrated in FIG. 4, once the phase of the detected synchronizing signal fluctuates, it follows that the discordance output signals are consecutively supplied from the discordance counter 5, even if there is no deviation in the synchronizing interval of the subsequent detected synchronizing signals. In the meantime, the output priority is given, not to the detected synchronizing signal, but to the protective synchronizing signal, with the result that this excessive reaction to the disturbance in synchronism further creates a deviation in phase of synchronism. As in the case of a reproduction signal of a compact disc, this synchronizing protective circuit is unsuitable for the synchronizing process of the digital data in which an error rate is low, but the jitter is troublesome.

SUMMARY OF THE INVENTION

It is an object of the present invention to provide a synchronizing protective circuit which does not have an excessive reaction to disturbances in synchronism.

This and other objects of the present invention are achieved by a window system synchronizing protective circuit according to the present invention which comprises: a window forming circuit for forming window signals, said window forming circuit forming a corresponding number of detecting windows to a predetermined number of bit clock pulses before and after detecting synchronizing signals; a protective synchronizing circuit for generating a protective synchronizing signal having a predetermined phasic relation to the detected synchronizing signal when the detected synchronizing signal is present in the detecting window; and a window reset circuit for changing the position of the detecting windows when the detected synchronizing signal has not been present in the detecting windows over a given period.

In accordance with the present invention, there are provided a corresponding number of detecting windows to a predetermined number of bit clock pulses before and after detecting forthcoming synchronizing signals on the basis of a counted value of the bit clock pulses counted between the detected synchronizing signals. If the detected synchronizing signal is present in the detecting window, the protective synchronizing signal having a predetermined phasic relation with respect to the detected synchronizing signal is outputted. If no detection synchronizing signal exists in the detecting window, the protective synchronizing signal is outputted on the assumption that the detected synchronizing signal would have been found in a substantially central portion of the detecting window. When the detected synchronizing signal is not present in the detecting windows in excess of a given period, the detecting windows are positioned to adjust to the next detected synchronizing signal, so that the synchronizing signal is protected by a method having the high efficiency.

DESCRIPTION OF THE PREFERRED EMBODIMENT

The preferred embodiment of the present invention will hereinafter be described with reference to FIGS. 1 and 2 wherein like references represent like parts throughout.

Figure 1:
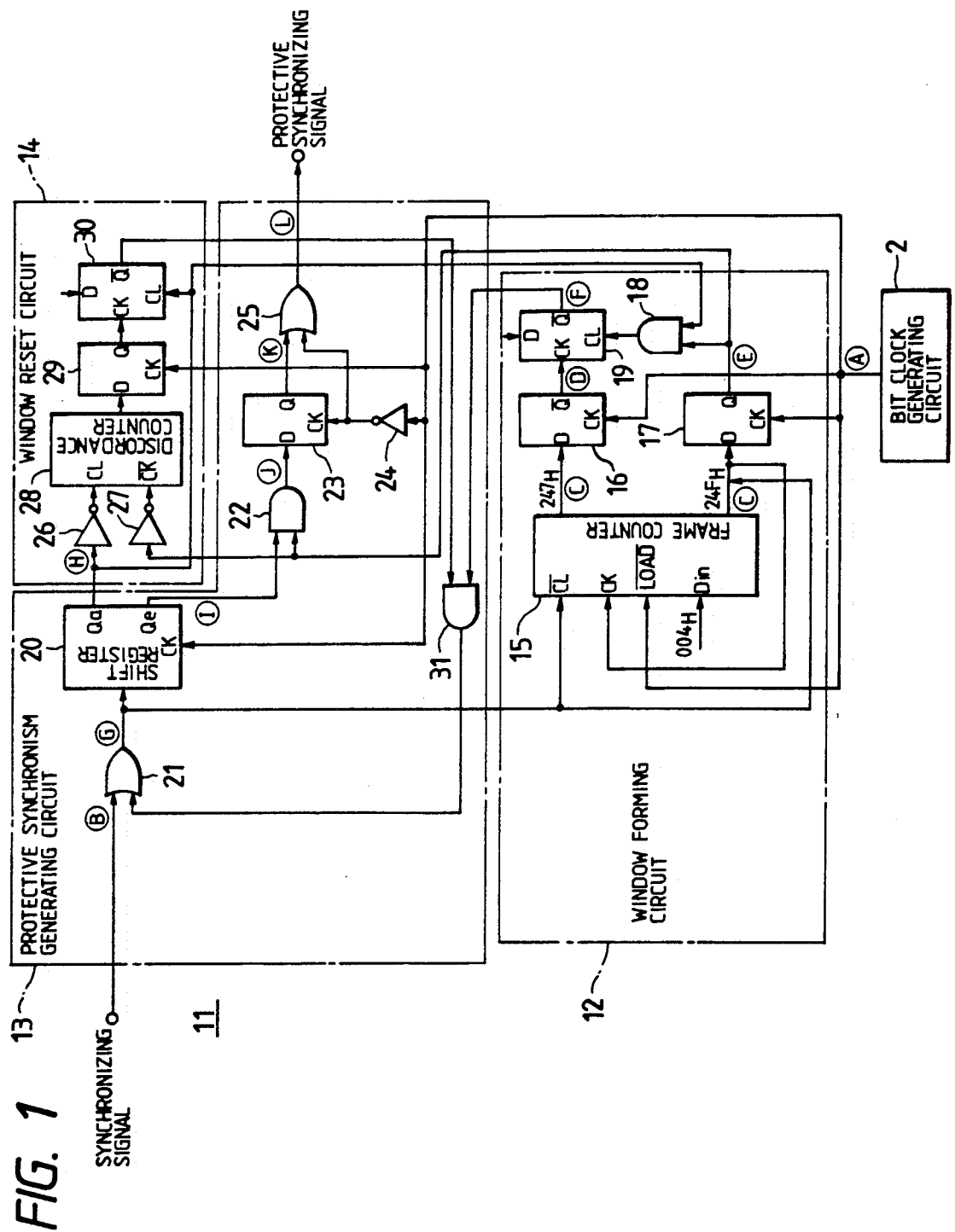
FIG. 1 is a circuit block diagram illustrating one embodiment of a window system synchronizing protective circuit according to the present invention.

In FIG. 1, a window system synchronizing protective circuit 11 is composed of a window forming circuit 12, a protective synchronism generating circuit 13 and a window reset circuit 14. The window forming circuit 12 includes a 588-nary frame counter 15 for counting bit clock pulses between detected synchronizing signals. The window forming circuit 12 forms a detecting window housing a maximum duration of 9 bit clock pulses on the basis of a counted value of the bit clock pulses. More specifically, the frame counter 15 is cleared when the detected synchronizing signal exist in a detecting window. The frame counter 15 serves to count the bit clock pulses supplied from the bit clock generating circuit 2. When the counted value of bit clock pulses reaches 247H, a front edge signal is outputted from the frame counter 15. If the counted value is greater than 24BH because the detected synchronizing signal is not present in a detecting window, and when reaching 24FH, a rear edge signal is outputted. The rear edge signal is fed back to a load input terminal, whereby a counted value of 004H inputted to a data input terminal is loaded.

Both edge signals indicating front and rear edges of the detecting window have negative polarity and are latched by D flip-flop circuits 16 and 17. The latched front edge signal from D flip-flop circuit 16 becomes a clock input of a D flip-flop circuit 19, which is cleared by the rear edge signal passing through AND gate 18. The AND gate 18 effects arithmetic operation of the logical product of the rear edge signal and a Qa output of a shift register 20 which will be mentioned later. A Q output of the D flip-flop circuit 19, the rising time of which differs according to this arithmetic result, is supplied as a window signal to the protective synchronism generating circuit 13.

The protective synchronism generating circuit 13 outputs the protective synchronizing signal having a predetermined phase relation with respect to the detected synchronizing signal when the detected synchronizing signal is present in the detecting window. The protective synchronism generating circuit 13 also outputs the protective synchronizing signal when no detected synchronizing signal is present in the detecting window on the assumption that detected synchronizing signal will be seen in a substantially central portion of the detecting windows. The detected synchronizing signal passes through an OR-gate 21 which ORs the window signal and the detected synchronizing signal, and is supplied to the shift register 20. The shift register 20 outputs Qa equivalent to one bit clock pulse and Qe equivalent to five bit clock pulses. The shift output Qa serves as one input of the AND gate circuit 18 and is fed to a window reset circuit 14. The shift output Qe passes through an AND gate circuit 22 which adds the outputs Q of the D flip-flop circuit 17 and Qe, and is supplied to the data input terminal of a D flip-flop circuit 23 in which a polarity inverting signal of a bit clock pulse serves as a clock input. As a result, D flip-flop circuit 23 generates output Q, which is defined as the previous form of the protective synchronizing signal, with a delay of five bit clock pulses from the detected synchronizing signal. A waveform of the output Q of the D flip-flop circuit 23 is shaped by means of an OR gate circuit 25 which ORs the outputs of an inverter circuit 24 for inverting the clocks, and the output Q becomes a protective synchronizing signal in its final form. An AND gate circuit 31 provided on the window signal supplying path to the OR gate circuit 21 shuts off the gate upon receiving the reset signal from the window reset circuit 14.

The window reset circuit 14 is intended to change the position of the detecting window in accordance with the subsequent detected synchronizing signal, if no detection synchronizing signal is present in the detecting window in excess of a given period. The window reset circuit 14 includes a discordance counter 28 in which the shift output Qa whose polarity is inverted by the inverter circuit 26 serves as a clear input, and the output Q of the D flip-flop circuit 17, the polarity of which is inverted by the inverter circuit 27, serves as a clock input. The discordance counter 28 supplies a discordance output to a D flip-flop circuit 29 of the next stage, when the as-uncleared clock input comes to a specified value (e.g., 3) because no detected synchronizing signal exists in the detecting window. The output Q of the D flip-flop circuit 29 becomes a clock input of a subsequent D flip-flop circuit 30. The D flip-flop circuit 30 serves to shut off the gate of an AND gate circuit 31 by means of an output Q (reset signal) assuming low level only when there is a clock input.

More specifically, the AND gate circuit 31 receives the reset signal from the window reset circuit 14 when the number of discordances exceeds the prescribed number, and shuts off the output Q, defined as the window signal, of the D flip-flop circuit 19. The window signal has thus been shut off by the AND gate circuit 31, thereby permitting a new detected synchronizing signal to directly pass through the OR gate circuit 21. Consequently, the position of detecting window is varied in accordance with this detected synchronizing signal.

Figure 2:
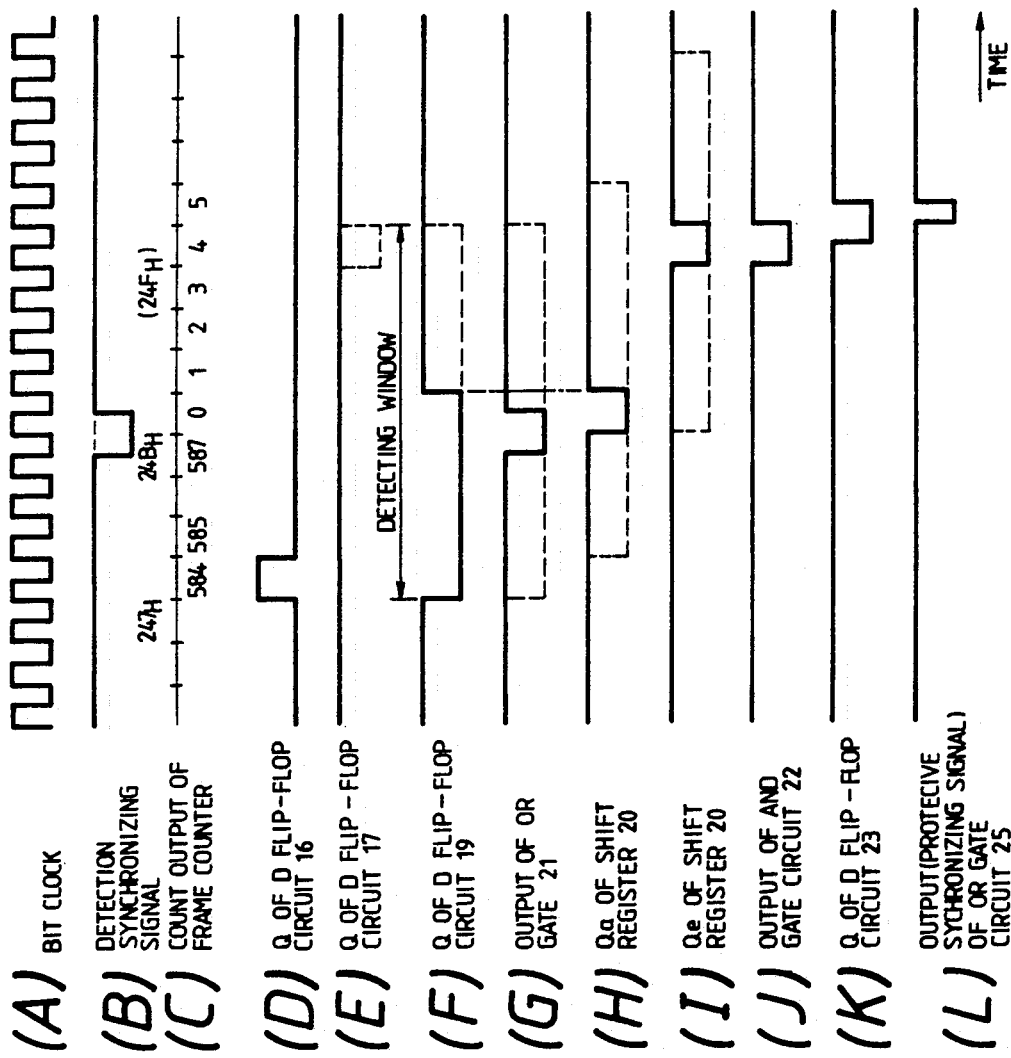
FIG. 2 is a diagram illustrating signal waveforms of respective portions of the circuit depicted in FIG. 1.
Figure 3:
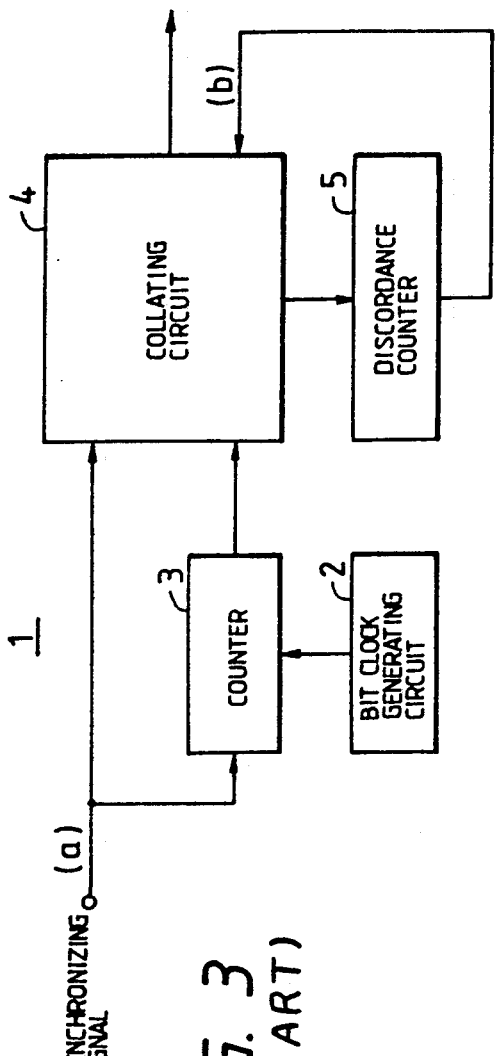
FIG. 3 is a circuit block diagram showing one example of a conventional (prior art) synchronizing protective circuit.
Figure 4:
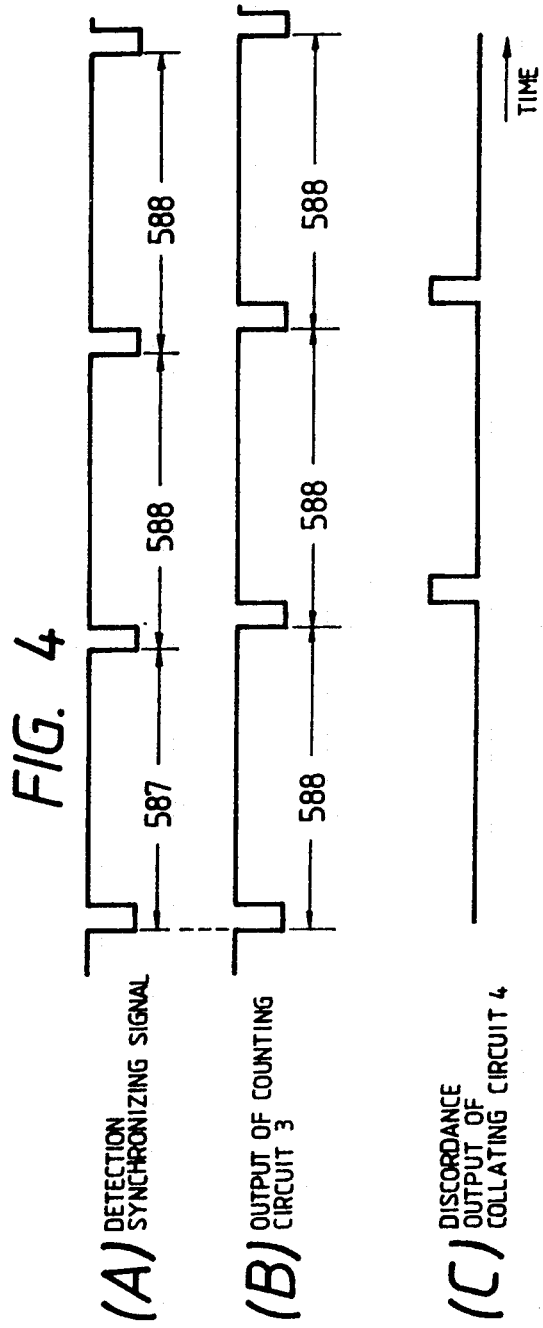
FIG. 4 is a diagram illustrating signal waveforms of the respective portions of the prior art circuit depicted in FIG. 3.

If the detected synchronizing signal is present in the detecting window, as indicated by solid lines (A) through (L) of FIG. 2, the protective synchronizing signal is outputted after five bit clocks from the detected synchronizing signal, and simultaneously the discordance counter 28 is reset. In contrast, if no detected synchronizing signal is present in the detecting window, the protective synchronizing signal is outputted immediately after the rear edge signal by means of the AND gate circuit 22 which has received the rear edge signal depicted with a dotted line of FIG. 2(E). Consistency of the synchronizing interval is thus kept. Namely, the results obtained are similar to those provided on the assumption that the detected synchronizing signal exists at the center of the detecting window.

When the counted value of the discordance counter 28 increases over a predetermined value, as described above, the output Q of the D flip-flop circuit 30 assumes low level, and the protective synchronizing signal is outputted with a delay of five bit clocks after inputting the next detection synchronizing signal.

In the present invention, an allowable range of phasic error between the detected synchronizing signal and the protective synchronizing signal is expanded within the detecting window. The detecting window is reset in association with only the extreme phasic fluctuations exceeding the prescribed number while positively overlooking slight fluctuations in phase of the individual detected synchronizing signals, thus steering clear of inconvenience of fostering the jitter due to too strict control over the phase. As a result, it is possible to obtain synchronizing protection in which the phasic relation between the detected synchronizing signal and the digital data is conserved as much as possible.

It is to be noted that a width of detecting window, which is prescribed by the window signal, may freely be varied by changing a preset counted value of the frame counter 15 in this embodiment. In addition, the predetermined value set in the discordance counter 28 may properly be adjusted to the characteristics of the digital data and the synchronizing signal.

While the invention has been described in connection with what is presently considered to be the most practical and preferred embodiment, it is to be understood that the invention is not limited to the disclosed embodiment but, on the contrary is intended to cover various modifications and equivalent arrangements included within the spirit and scope of the appended claims.

What is claimed is:

1. A window system synchronizing protective circuit comprising:

a bit clock for producing bit clock pulses;

window dorming circuit means for forming a variable-duration window having a predetermined position and a maximum duration corresponding to a predetermined number of said bit clock pulses, said window forming circuit means generating a window signal representing said window;

protective synchronizing circuit means for detecting a synchronizing signal within said window and generating a protective synchronizing signal in accordance with said window signal, said duration of said window being terminated upon the detection of the synchronizing signal; and window reset circuit means, responsive to said window forming circuit means and said protective synchronizing circuit means, for changing the position of said window when the synchronizing signal has not been detected in said window over a predetermined period.

2. A window system synchronizing protective circuit as in claim 1 wherein said window forming circuit means includes a counter for counting bit clock pulses between the detected synchronizing signal and a next synchronizing signal, said counter being cleared when a synchronizing signal is detected in the window.

3. A window system synchronizing protective circuit as in claim 2, wherein said counter includes means for outputting a front edge signal after said counter has counted a first predetermined number of bit clock pulses.

4. A window system synchronizing protective circuit as in claim 3, wherein said counter includes means for outputting a rear edge signal when the counter has counted more than a second predetermined number of bit clock pulses and when no synchronizing signal is detected after said counter has counted a third predetermined number of bit clock pulses.

5. A window system protective circuit as in claim 4 wherein said protective synchronizing circuit means includes means for outputting said protective synchronizing signal having a phasic relation to said detected synchronizing signal detected within said window and for outputting a protective synchronizing signal having no phasic relation when so synchronizing signal has been detected by said window.

6. A window system protective circuit as in claim 5 wherein said outputting means of said protective synchronizing circuit means includes an OR gate which receives and ors said window signal and said detected synchronizing signal.

7. A window system protective circuit as in claim 6 wherein said window reset circuit includes means for preventing said window signal from being transmitted to said OR gate when said synchronizing signal has not been present for a predetermined period.

8. A window as in claim 7 wherein said protective synchronizing circuit includes means for outputting said protective synchronizing signal with a delay of five bit clock pulses from said detected synchronizing signal.

9. A method of protecting a synchronizing signal comprising steps of:

producing bit clock pulses;

forming a variable-duration window having a maximum duration corresponding to a predetermined number of bit clock pulses;

detecting an occurrence of said synchronizing signal within said window;

terminating the duration of said window upon said detection of the occurrence of the synchronizing signal;

generating a protective synchronizing signal, said protective synchronizing signal having a phase relation to said synchronizing signal when said synchronizing signal is detected within said window; and changing the subsequent position of said window when said synchronizing signal has not been detected over a predetermined period.

10. A method as in claim 9 further comprising the step of counting bit clock pulses between the detected synchronizing signal and a next synchronizing signal.

11. A method as in claim 10 further comprising the steps of:

outputting a front edge signal after a first predetermined number of bit clock pulses has been counted after the detected synchronizing signal;

outputting a rear edge signal after a second predetermined number of bit clock pulse has been counted; and outputting a rear edge signal after a third predetermined number of bit clock pulses has been counted.

12. A window system synchronizing protective circuit comprising:

a bit clock for producing bit clock pulses;

a window forming circuit for generating a window signal and for detecting a synchronizing signal, said window forming circuit having a counter for counting bit clock pulses between the detected synchronizing signal and a next synchronizing signal, said window forming circuit forming a variable-duration window having a maximum duration corresponding to a predetermined number of bit clock pulses, said duration being terminated upon said detection of said synchronizing signal; and a window reset circuit responsive to said window forming circuit, said window reset circuit changing a position of the window when the synchronizing signal has not been detected in successive windows over a predetermined period.

13. A window system synchronizing protective circuit as in claim 12 wherein said counter includes means for outputting a front edge signal after said counter has counted a first predetermined number of bit clock pulses and a rear edge signal after a second predetermined number of bit clock pulses has been counted.

14. A window system synchronizing protective circuit comprising:

a bit clock for producing bit clock pulses;

window forming circuit means for forming a window having a predetermined position and a maximum duration corresponding to a predetermined number of said bit clock pulses, said window forming circuit means generating a window signal representing said window;

protective synchronizing circuit means for detecting a synchronizing signal within said window and generating a protective synchronizing signal in accordance with said window signal;

window reset circuit means, responsive to said window forming circuit means and said protective synchronizing circuit means, for changing the position of said window when the synchronizing signal has not been detected in said window over a predetermined period;

wherein said window forming circuit means includes a counter for counting bit clock pulses between the detected synchronizing signal and a next synchronizing signal, said counter being cleared when a synchronizing signal is detected in the window, said counter including:

means for outputting a front edge signal after said counter has counted a first predetermined number of bit clock pulses, means for outputting a rear edge signal when the counter has counted more than a second predetermined number of bit clock pulses and when no synchronizing signal is detected after said counter has counted a third predetermined number of bit clock pulses; and wherein said protective synchronizing circuit means includes means for outputting said protective synchronizing signal having a phasic relation to said detected synchronizing signal detected within said window and for outputting a protective synchronizing signal having no phasic relation when no synchronizing signal has been detected by said window.

15. A window system protective circuit as in claim 14 wherein said outputting means of said protective synchronizing circuit means includes an OR gate which receives and ors said window signal and said detected synchronizing signal.

16. A window system protective circuit as in claim 15 wherein said window reset circuit includes means for preventing said window signal from being transmitted to said OR gate when said synchronizing signal has not been present for a predetermined period.

17. A window as in claim 16 wherein said protective synchronizing circuit includes means for outputting said protective synchronizing signal with a delay of five bit clock pulses from said detected synchronizing signal.

* * * * *